(12) United States Patent
Nishiyama

(10) Patent No.: US 9,325,629 B2
(45) Date of Patent: Apr. 26, 2016

(54) DATA PROCESSING APPARATUS AND PROGRAM

(75) Inventor: Hirohito Nishiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 136 days.

(21) Appl. No.: 14/370,106

(22) PCT Filed: Apr. 20, 2012

(86) PCT No.: PCT/JP2012/060695
§ 371 (c)(1),
(2), (4) Date: Jul. 1, 2014

(87) PCT Pub. No.: WO2013/157133
PCT Pub. Date: Oct. 24, 2013

(65) Prior Publication Data
US 2015/0304225 A1    Oct. 22, 2015

(51) Int. Cl.
*H04L 12/841* (2013.01)
*H04L 29/08* (2006.01)
*B60R 16/023* (2006.01)

(52) U.S. Cl.
CPC ............ *H04L 47/283* (2013.01); *B60R 16/023* (2013.01); *H04L 67/12* (2013.01)

(58) Field of Classification Search
CPC ...................... B60R 16/023; B60R 16/0315
See application file for complete search history.

(56) References Cited

U.S. PATENT DOCUMENTS

| 6,151,306 A | 11/2000 | Ogasawara et al. |
| 7,243,012 B2 | 7/2007 | Miyake et al. |
| 2003/0076221 A1* | 4/2003 | Akiyama .......... H04L 12/40182 340/12.32 |
| 2005/0049722 A1* | 3/2005 | Kobayashi ........ B60W 50/0205 700/9 |
| 2005/0135133 A1* | 6/2005 | Maehara ................. H02J 7/244 363/144 |

(Continued)

FOREIGN PATENT DOCUMENTS

| JP | 2 1649 | 1/1990 |
| JP | 5-235962 | 9/1993 |

(Continued)

OTHER PUBLICATIONS

U.S. Appl. No. 14/762,305, filed Jul. 21, 2015, Tsujimura, et al.

(Continued)

*Primary Examiner* — Vivek Srivastava
*Assistant Examiner* — Muhammad Raza
(74) *Attorney, Agent, or Firm* — Oblon, McClelland, Maier & Neustadt, L.L.P.

(57) ABSTRACT

When a fixed-cycle transmission timing arrives, a fixed-period communication processing section transmits data in a shared memory to a BCM. An event table storage section stores an event table that indicates a condition of data to be transmitted by an event communication processing section and a permitted delay time, which is the period of time permitted starting from when the data satisfying the condition is extracted, until the data is transmitted. An event detecting section extracts the data in the shared memory satisfying the condition indicated by the event table. The event communication processing section transmits to the BCM the data extracted by the event detecting section, before the arrival of the transmission timing of the fixed-period communication processing section, and by the timing at which the permitted delay time elapses from the time of the data extraction by the event detecting section.

9 Claims, 8 Drawing Sheets

(56) References Cited

U.S. PATENT DOCUMENTS

| | | | | |
|---|---|---|---|---|
| 2005/0254518 A1* | 11/2005 | Fujimori | H04L 69/08 370/466 |
| 2011/0029704 A1* | 2/2011 | Itou | H04L 12/40163 710/110 |
| 2011/0128855 A1* | 6/2011 | Ando | H04J 3/0652 370/236 |
| 2011/0245934 A1* | 10/2011 | Yasuda | G06F 9/52 700/19 |
| 2011/0320079 A1* | 12/2011 | Yasuda | G06F 9/52 701/22 |

FOREIGN PATENT DOCUMENTS

| | | |
|---|---|---|
| JP | 6 30003 | 2/1994 |
| JP | 10 3394 | 1/1998 |
| JP | 10-257078 | 9/1998 |
| JP | 2004 268624 | 9/2004 |
| JP | 2004 274931 | 9/2004 |
| JP | 2007 28377 | 2/2007 |
| JP | 2009 17154 | 1/2009 |
| JP | 2010 274783 | 12/2010 |
| JP | 2011 244142 | 12/2011 |

OTHER PUBLICATIONS

U.S. Appl. No. 14/766,054, filed Aug. 5, 2015, Nishiyama.

International Search Report Issued Jun. 12, 2012 in PCT/JP12/060695 Filed Apr. 20, 2012.

* cited by examiner

Fig. 2

EVENT TABLE

| EVENT NUMBER | MONITORING OBJECT | EVENT DETECTION CONDITION | PERMITTED DELAY TIME |
|---|---|---|---|
| EVENT #1 | I/O #1 | RISING EDGE | 3ms |
| EVENT #2 | I/O #2 | BOTH EDGES | 5ms |
| EVENT #3 | I/O #3 | BOTH EDGES | 5ms |
| EVENT #4 | I/O #4 | RISING EDGE | 8ms |
| EVENT #5 | I/O #5 | BOTH EDGES | 8ms |

Fig. 3

EVENTS EXPECTED IN THE SYSTEM

| EVENT NUMBER | MONITORING OBJECT | EVENT DETECTION CONDITION | PERMITTED DELAY TIME | MAXIMUM EVENT GENERATON CYCLE |
|---|---|---|---|---|
| EVENT #1 | I/O#1 | RISING EDGE | 3ms | 1 sec |
| EVENT #2 | I/O#2 | BOTH EDGES | 5ms | 500ms |
| EVENT #3 | I/O#3 | BOTH EDGES | 5ms | 100ms |
| EVENT #4 | I/O#4 | RISING EDGE | 8ms | 100ms |
| EVENT #5 | I/O#5 | BOTH EDGES | 8ms | 50ms |
| EVENT #6 | I/O#1 | FALLING EDGE | 10ms | 1 sec |
| EVENT #7 | I/O#4 | FALLING EDGE | 10ms | 100ms |
| EVENT #8 | I/O#6 | BOTH EDGES | 20ms | 20ms |
| .. | .. | .. | .. | .. |
| EVENT #n | | | | |

DATA PROCESSING APPARATUS AND PROGRAM

TECHNICAL FIELD

The present invention relates to a technology to improve efficiency in data transmission.

Hereinafter, a technology to improve efficiency in data transmission is discussed mainly with reference to an in-vehicle system as an example.

BACKGROUND ART

The body system of an automobile uses for control an ECU (electronic control unit), which is generically called a body control module (BCM), connected to an I/O device via an exclusive line. The problem is, however, that the number of signal lines increases with the increasing systems to be controlled.

As a solution to this problem, Patent Document 1 discloses a method for controlling I/O devices, in which the state signal of each I/O device is accommodated in a multiplex transmission apparatus disposed in each of the parts of a vehicle, and the multiplex transmission apparatus is connected to a BCM via a multiplex transmission line.

Another method is disclosed in Patent Document 2, which is applied to a communication system using a multiplex transmission apparatus such as mentioned above. This method is designed to enable a BCM to detect a change in input data in a short amount of time, by transmitting the input data with the change to the BCM from the multiplex transmission apparatus when there is the change in the input data from an I/O device.

CITATION LIST

Patent Literature

Patent Document 1: JP 02-1649 A
Patent Document 2: JP 06-30003 A

SUMMARY OF INVENTION

Technical Problem

In order to reduce costs, the multiplex transmission line mentioned above is used for data exchange not only between a BCM and a multiplex transmission apparatus but also between ECU units.

In an in-vehicle system, exchanging data between ECU units needs to have a predetermined real-time property because the data will be used for controlling the body of a vehicle in motion, or the like.

For this reason, although it is required to notify the BCM of the change in the input data promptly, data transmission from the multiplex transmission apparatus to the BCM needs to be restricted to ensure the real-time property.

More specifically, the communication band used by the multiplex transmission apparatus needs to be kept within a certain range in order for other devices to communicate.

In the method where input data is transmitted to the BCM from the multiplex transmission apparatus whenever there is a change in the input data, it is required to keep allocating to the multiplex transmission apparatus the communication band being wide enough to cope with a situation in which changes in the input data occur intensively in a certain period of time.

This results in failing to ensure a sufficient range of the communication band for other devices which use the same multiplex transmission line.

In view of the aforementioned circumstances, a main objective of the present invention is to achieve a configuration with which specific data is transmitted without delay while the communication band is restricted.

Solution to Problem

A data processing apparatus according to the present invention includes:

a data receiving section that receives data;

a first data transmitting section that transmits the data received by the data receiving section to a transmission destination apparatus, upon arrival of a transmission timing which arrives repeatedly, the data to be transmitted received before the arrival of the transmission timing;

a second data transmitting section that transmits the data received by the data receiving section to the transmission destination apparatus before the arrival of the transmission timing of the first data transmitting section;

a condition information storage section that stores condition information, which indicates a condition of the data to be transmitted by the second data transmitting section, and a permitted delay time, which is a period of time permitted starting from when the data satisfying the condition is extracted, until the data satisfying the condition is transmitted; and an event data extracting section that monitors the data received by the data receiving section, and extracts, as event data, the data satisfying the condition indicated by the condition information.

The second data transmitting section transmits the event data extracted by the event data extracting section to the transmission destination apparatus, before the arrival of the transmission timing of the first data transmitting section, and by an event data transmission time limit, which is a timing at which the permitted delay time elapses from the time of the event data extraction by the event data extracting section.

Advantageous Effects of Invention

According to the present invention, data items are transmitted all at once upon arrival of a transmission timing. This results in eliminating the need to keep allocating to a data processing apparatus a certain range of the communication band, thereby achieving the restriction of the communication band.

Further, event data is transmitted within a permitted delay time prior to the arrival of the transmission timing, thereby allowing specific data to be transmitted without delay.

BRIEF DESCRIPTION OF DRAWINGS

FIG. 2 shows an example of an event table according to the first embodiment.

FIG. 3 shows examples of events expected in the in-vehicle system according to the first embodiment.

DESCRIPTION OF EMBODIMENTS

Embodiment 1.

A first embodiment describes a configuration of an in-vehicle system to improve response performances and reduce the range of the communication band.

More specifically, the first embodiment describes the configuration which ensures that a change in input data from an I/O device is notified to a BCM within a predetermined period of time, and keeps the occupancy of a multiplex transmission line by a multiplex transmission apparatus within a certain rate in a predetermined period of time.

Figure 1:
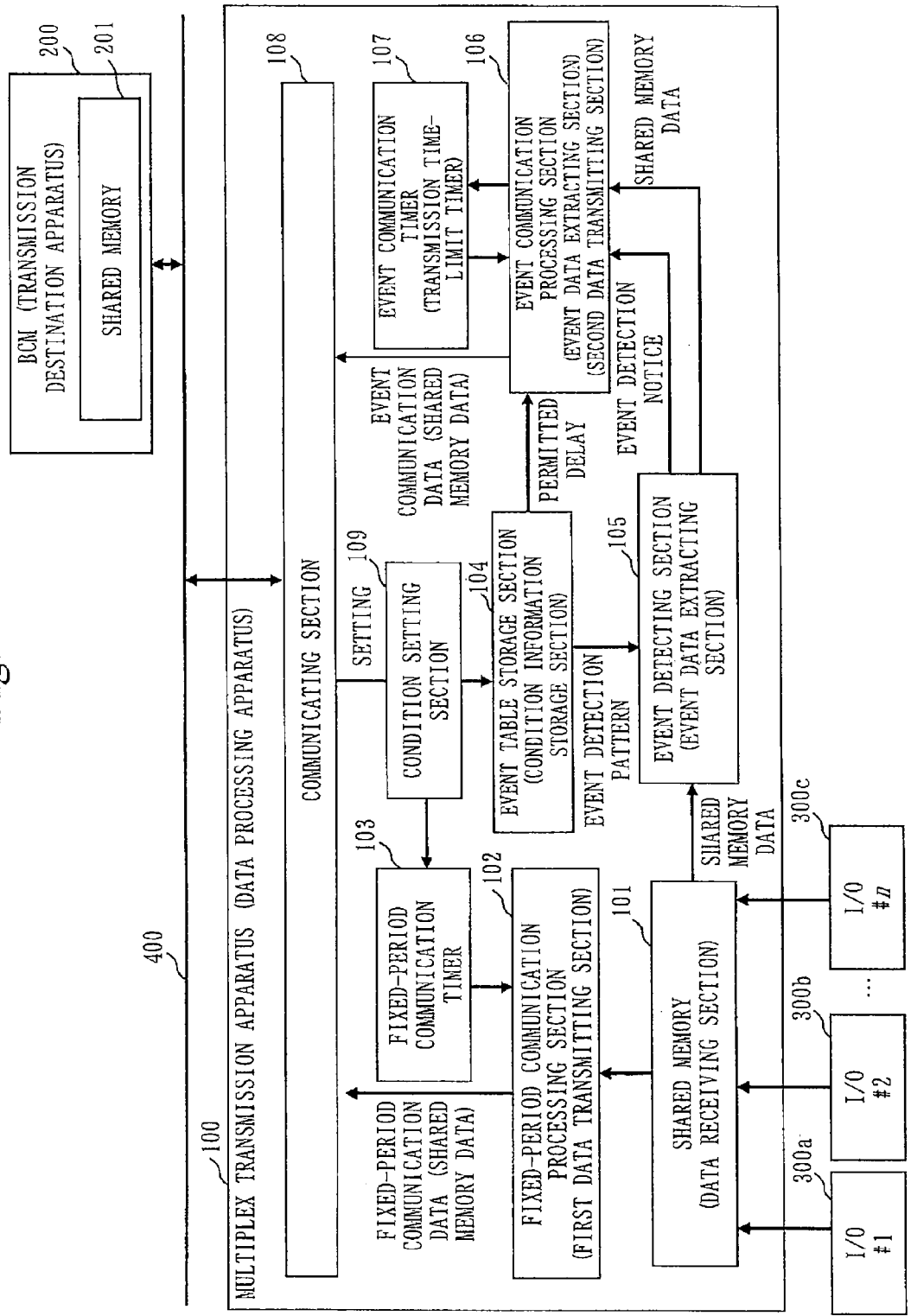
FIG. 1 shows an example of the configuration of an in-vehicle system accordnig to a first embodiment.

FIG. 1 shows an example of the configuration of an in-vehicle system according to this embodiment.

A BCM 200 receives, over a network, the value of a shared memory 101 of a multiplex transmission apparatus 100 (hereinafter, referred to also as "DHM 100") regularly or upon occurrence of an event, to recognize an input from an I/O device.

A CAN (control area network) 400 is a network connecting the BCM 200 and the DHM 100.

The DHM 100 corresponds to an example of a data processing apparatus, and the BCM 200 corresponds to an example of a transmission destination apparatus.

The DHM 100 of this embodiment is discussed below in detail.

Input data from an I/O device 300 is stored in the shared memory 101 in the DHM 100.

The shared memory 101 stores a collection of inputs from a plurality of I/O devices 300 connected to the DHM 100. The input data of each I/O device 300 is represented by 1 bit if it is of a contact input, and an 8-bit value through A/D conversion if it is analogue data.

The data format in the shared memory 101 is determined by the system design according to the number and type of the I/O devices 300 connected.

The shared memory 101 corresponds to an example of a data receiving section.

A fixed-period communication processing seciton 102 retrieves data of the shared memory 101 (hereinafter, the data of the shared memory 101 is referred to as "shared memory data") whenever a fixed-cycle transmission timing generated by a fixed-period communication timer 103 arrives, and transmits the shared memory data to the BCM 200.

The fixed-period communication processing section 102 corresponds to an example of a first data transmitting section.

The fixed-period communication timer 103 provides the fixed-period communication processing section 102 with a transmission timing in a fixed cycle. The cycle may have a predetermined value in advance, or be provided dynamically by the BCM 200 upon initialization and during operation.

An event table storage section 104 stores a table where events to be detected by the DHM 100 are listed.

FIG. 2 shows an event table.

The event table, as seen in FIG. 2, defines monitoring objects, event detection conditions, and permitted delay times.

More specifically, conditions (monitoring object and event detection condition) of the shared memory data to be transmitted by an event communication processing section 106, discussed later, and a permitted delay time which is the period of time permitted starting from when the shared memory data satisfying the conditions is extracted, until the shared memory data is transmitted, are listed in the event table.

The event table corresponds to an example of condition information and the event table storage section 104 corresponds to an example of a condition information storage section.

Referring further to FIG. 2, as the monitoring object, a condition relating to the I/O device of a transmission source of the shared memory data to be transmitted by the event communication processing section 106 is defined.

As the event detection condition, a condition relating to a data value of the shared memory data to be transmitted by the event communication processing section 106 is defined.

More specifically, when the I/O device 300 to be monitored is a contact input device, a rising-edge detection, a falling-edge detection, rising- and falling-edge detections, etc. of an input signal can be set as the event detection condition. When the I/O device 300 is an analogue input device, the detection of a data value surpassing or falling below a threshold value can be set as the event detection condition.

The permitted delay time is the period of time permitted starting from when an event occurs, until the event is transmitted. More specifically, the permitted delay time is the amount of time obtained by subtracting from an event detection delay time permitted by the system, the amount of time required for data transmission over the network and a delay time starting from when the BCM 200 receives data, until the BCM 200 starts a process for an event.

An event detecting section 105 retrieves the event table, monitors the content of the shared memory 101 based on the conditions (monitoring object and event detection condition) of the event table, and detects whether an event set in the event table has occurred.

When detecting that the event has occurred, the event detecting section 105 notifies the event communication processing section 106 of an event detection notice, and outputs the shared memory data at the time when the event occurs to the event communication processing section 106.

The event detection notice identifies the event that has occurred.

Specifically, an "event number" in the event table is written in the event detection notice.

The term "event has occurred" means that the data satisfying the conditions (monitoring object and event detection condition) in the event table has been inputted to the shared memory 101.

Specifically, the event detecting section 105 monitors data inputted to the shared memory 101, and extracts the shared memory data that satisfies the conditions (monitoring object and event detection condition) listed in the event table.

The shared memory data that is extracted by the event detecting section 105 upon occurrence of an event is referred to also as "event data".

The event detecting section 105 corresponds to an example of an event data extracting section, and so does the event communication processing section 106.

The event communication processing section 106, upon receipt of the event detection notice from the event detecting section 105, performs an event communication of the content of the shared memory at the time when the event occurs.

The event communication processing section 106 transmits the event data to the BCM 200 via a communicating section 108 by the time at which the permitted delay time elapses (event data transmission time limit) from the time of the event detecting section 105 detecting the event occurrence (Le., time of the event data extraction).

Figure 6:
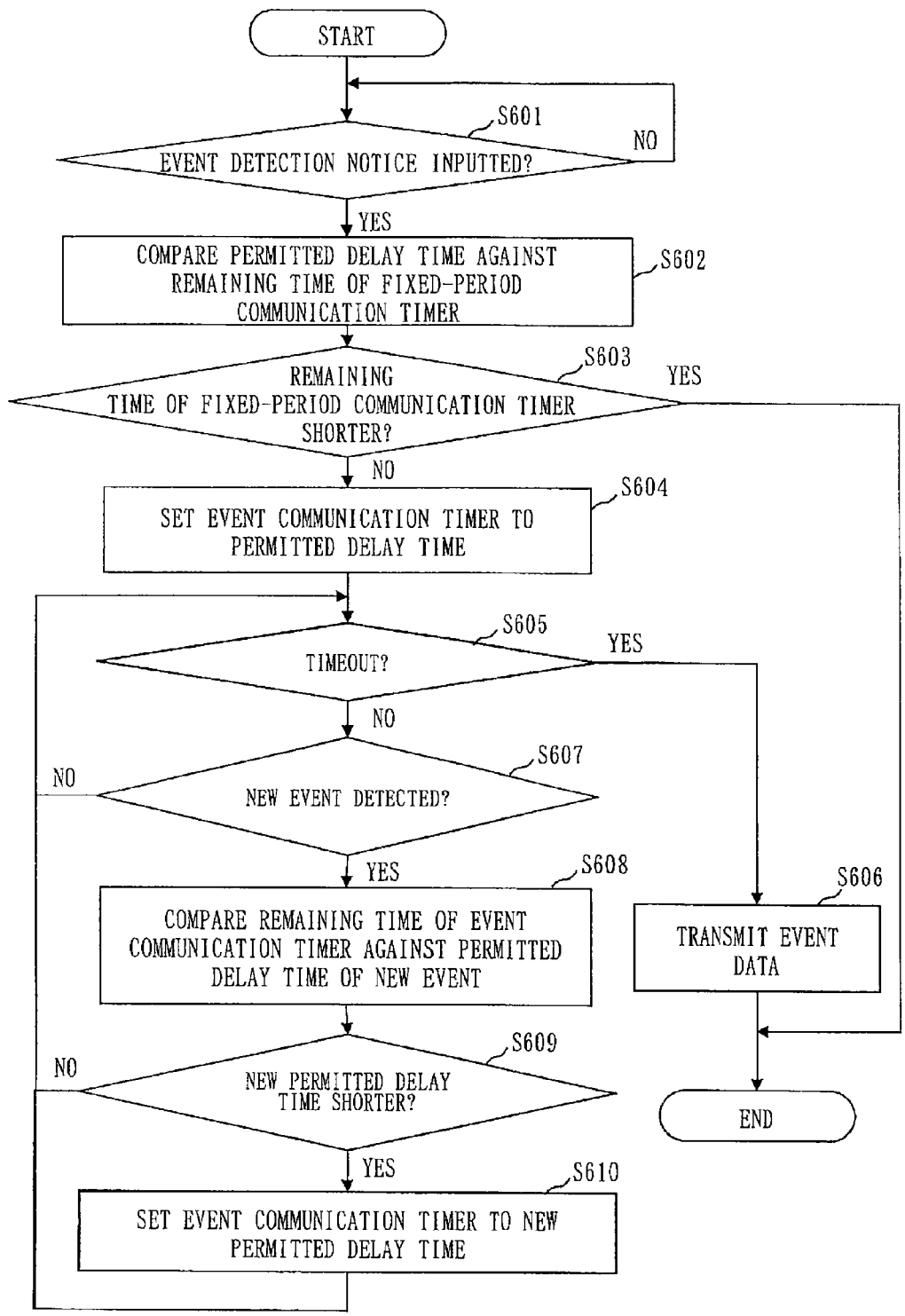
FIG. 6 is a flow chart illustrating an operational process at the time of event communication according to the first embodiment.

More precisely, the event communication processing section 106 performs the event communication, according to the procedure exemplified in FIG. 6.

Individual steps shown in FIG. 6 will be discussed later.

As aforementioned, the event communication processing section 106 corresponds to an example of the event data extracting section, and so does the event detecting section 105.

The event communication processing section 106 also corresponds to an example of a second data transmitting section.

An event communication timer 107 is set to the permitted delay time by the event communication processing section 106, and notifies the event communication processing section 106 of the expiry of the permitted delay time, i.e., the event data transmission time limit.

The event communication timer 107 corresponds to an example of a transmission time-limit timer.

The communicating section 108 transmits to the CAN 400 fixed-period communication data (shared memory data) from the fixed-period communication processing section 102 and event communication data (shared memory data) from the event communication processing section 106.

A condition setting section 109 changes timer values of the fixed-period communication timer 103 and changes the content of the event table.

The condition setting section 109 will be discussed later in detail in a third embodiment.

An operational procedure of the event communication processing section 106 is discussed below in detail with reference to FIG. 6.

The event communication processing section 106 retrieves, upon receipt of the event detection notice from the event detecting section 105 (YES in S601), the permitted delay time registered in the event table, and compares the retrieved permitted delay time against the remaining time left on the fixed-period communication timer 103 (S602).

The event communication processing section 106 thus determines which of the event data transmission time limit and the next transmission timing of the fixed-period communication processing section 102 arrives first.

When the remaining time on the fixed-period communication timer 103 is shorter than the permitted delay time (YES in S603), the event communication processing section 106 determines that the fixed-period communication will be performed within the permitted delay time by the fixed-period communication processing section 102, and cancels the event communication.

In this case, the event data is transmitted to the BCM 200 by the fixed-period communication processing section 102.

When the permitted delay time is shorter (NO in S603), the event communication processing section 106 inputs the event data from the event detecting section 105, and sets the event communication timer 107 to the permitted delay time (S604).

Then, upon issuance of a timeout by the event communication timer 107 (YES in S605), the event communication processing section 106 transmits the event data to the BCM 200 via the communicating section 108 (S606).

When a new event occurs while waiting for the timeout (YES in S607), the event communication processing section 106 compares the remaining time on the event communication timer 107 against the permitted delay time of the new event (S608).

Thus, it is determined which of the event data transmission time limit of the new event data and the timeout of the event communication timer 107 arrives first.

The determination of S607 includes processes in S601 to S603.

Specifically, the event communication processing section 106 inputs the new event detection notice from the event detecting section 105 (S601), and compares the permitted delay time of the new event against the remaining time on the fixed-period communication timer 103 (S602, S603). As a result, when the permitted delay time of the new event is shorter, YES is determined in S607.

When YES in S607, the event communication processing section 106 inputs new event data from the event detecting section 105.

When the remaining time on the event communication timer 107 is shorter than the permitted delay time of the new event (NO in S609), the event communication timer 107 is not reset.

When the permitted delay time of the new event is shorter (YES in S609), the event communication processing section 106 sets the event communication timer 107 to the permitted delay time of the new event (S610).

When the event communication timer 107 issues the timeout (YES in S605), the event transmission of the content of the shared memory 101 at the time when the last event occurs, is performed.

More specifically, all items of the event data that have been extracted by the event detecting section 105 before the timeout is issued by the event communication timer 107 are transmitted to the BCM 200.

It is also possible that the fixed-period communication timer 103 clears the counter and resumes measuring for the next transmission timing, after the fixed-period communication and the event communication are performed.

Alternatively, the counter may be cleared and the measurement is resumed for the next transmission timing, only after the fixed-period communication is performed.

In the former case, the number of data transmission times is minimized, the real-time property of every data item which is kept within a fixed cycle is ensured, and events can be notified within the permitted delay time.

In the latter case, although the volume of communication is increased compared to the former case, the fixed-period communication is performed at regular intervals regardless of the presence or absence of an event. Therefore, the latter case is applicable to network delay measurement, and network security measurement against the failure of data reception and the like.

Effects of this embodiment are discussed below in detail.

FIG. 3 shows a list of n events expected in the in-vehicle system discussed in this embodiment.

Referring to FIG. 3, the events are listed in order of the period of time of the permitted delay time from the shortest, in which an event 9 and the subsequent events are not shown.

With this example, when the event communication is performed whenever an event occurs, it is necessary to consider a situation in which all the n events defined in the system occur intensively in a certain period of time. The communication band needs to have the range proportional to the number of I/O devices.

Depending on the value of n, the required range of the communication band would increase and a sufficient range of the communication band cannot be ensured for other systems to use the CAN 400.

In contrast, according to the method of this embodiment, all the events can be transmitted to the BCM 200 within the permitted delay time, by registering events #1 to #5 in the event table (FIG. 2) and setting the cycle of the fixed-period communication to 10 ms (permitted delay time for event #6, #7).

Figure 8:
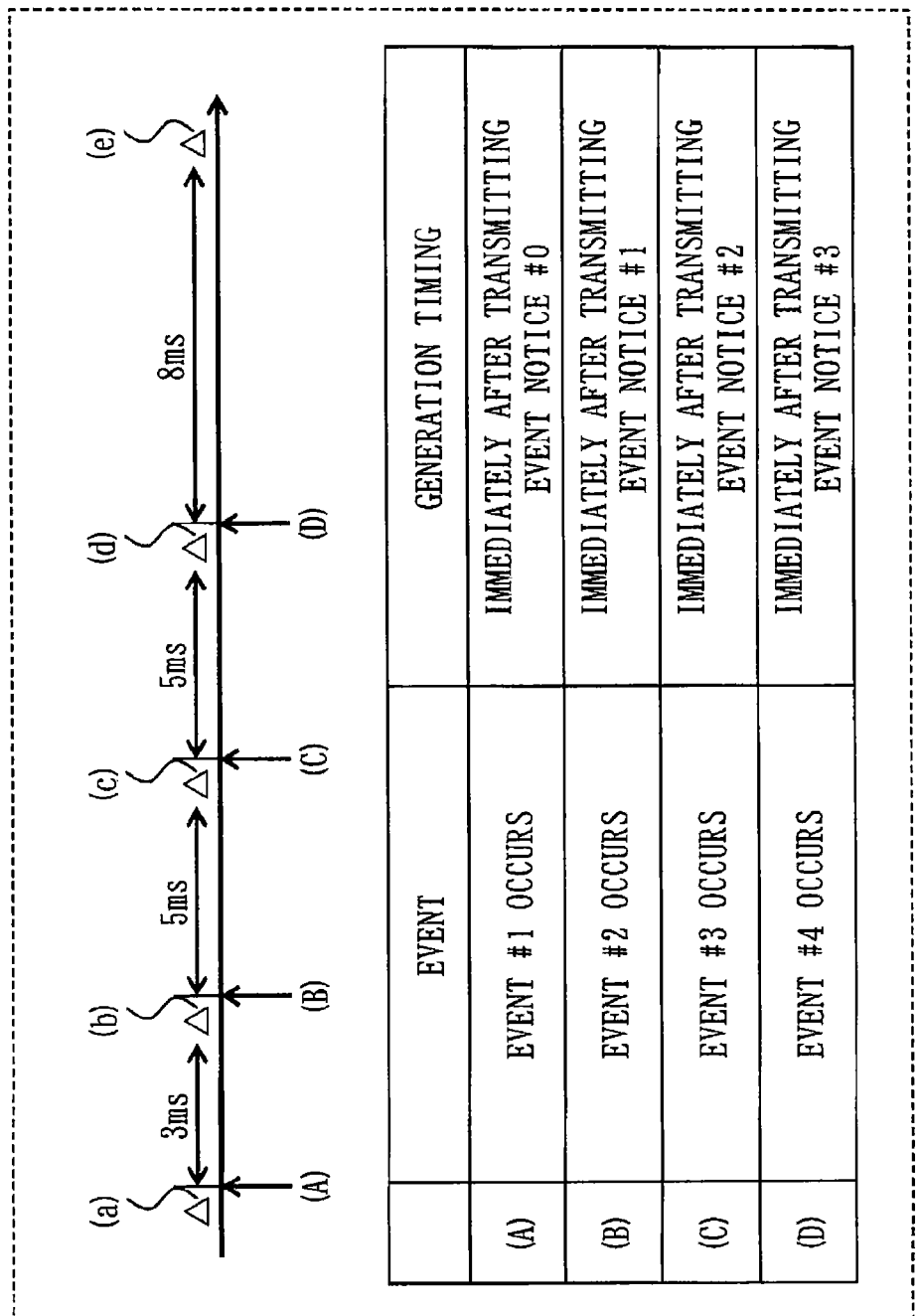
FIG. 8 shows an example of events expected in the in-vehicle system in order of occurrence, according to the first embodiment.

As for the required range of the communication band, system design can be possible by defining events to be handled. FIG. 8 shows a maximum volume of communication in the case of the events handled in this embodiment and when the counter for measuring the fixed-period communication timing is cleared after the event communication is performed.

Referring to FIG. 8, Δ denotes a frame transmission time, and (a) denotes a fixed-period transmission or any event transmission. The earliest frame transmission after (a) takes place when an event #1 having the shortest permitted delay time occurs immediately after the previous frame transmission. Time (b) of the earliest frame transmission after (a) is 3 ms, which is the permitted delay time of the event #1, after the event #1 has occurred. The earliest frame transmission after (b) takes place when an event #2 having the second shortest permitted delay time occurs immediately after (b) because the event #1 is not supposed to occur within the period of 1 second. Time (c) of the earliest frame transmission after (b) is 5 ms, which is the permitted delay time of the event #2, after the event #2 has occurred. Likewise, the earliest frame transmission after (c) takes place when an event #3 occurs immediately after (c), and frame transmission time (d) is 5 ms after the event #3 has occurred. The earliest frame transmission after (d) takes place when an event #4 occurs immediately after (d), and frame transmission time(e) is 8 ms after the event #4 has occurred. During this period of time, if an event other than the events #1 to #4 occurs, that specific event is notified via the frame that will be transmitted in the nearest future after that specific event has occurred, among the frames transmitted at the times (a) to (e). Therefore, during an arbitrary period of 3 ms, a maximum number of communication frames is 1, and during an arbitrary period of 20 ms, a maximum number of communication frames is 4.

Thus, if the value of n is large, a sufficient range of the communication band can be ensured for other systems to use the CAN 400.

As discussed, this embodiment describes the in-vehicle system which includes a controller for controlling the system, and one or more multiplex transmission apparatuses to which one or more I/O devices controlled or referred to by the controller, are connected.

Further, this embodiment describes the multiplex transmission apparatus which performs the fixed-period transmission of input data from the I/O devices connected to the multiplex transmission apparatuses, as a group of data.

Further, the multiplex transmission apparatus, as described, monitors inputs from the specific I/O device, detects an event when the specific input state is observed, and performs the event transmission of the input data of the specific I/O device, as a group of data.

With further reference to the event transmission, as described, the event transmission time limit is determined by adding the permitted delay time to the time when an event is detected.

Further, as described, when one or more events occur, the event transmission of a group of input data from the specific I/O device as the data notifying of all the events that have occurred, is performed at the time of the earliest event transmission time limit.

Further, this embodiment describes the multiplex transmission apparatus which performs the event notification by the fixed-period transmission when the fixed-period transmission timing arrives by the event transmission time limit.

Further, as described in this embodiment, a subsequent fixed-period transmission is performed after a lapse of a certain period of time from the previous fixed-period transmission or the previous event transmission.

Embodiment 2.

Figure 4:
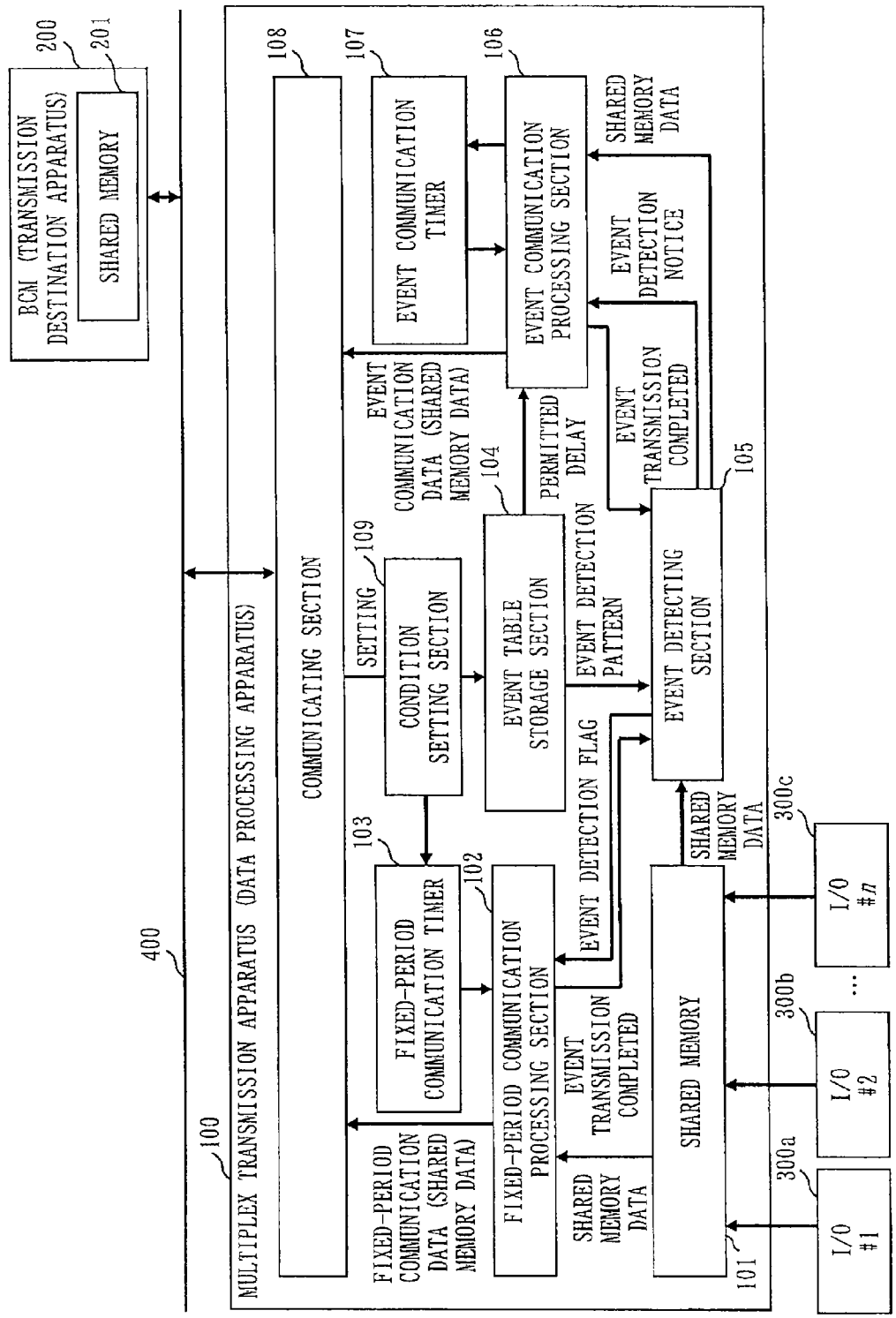
FIG. 4 shows an example of the configuration of an in-vehicle system according to a second embodiment.

FIG. 4 shows an example of the configuration of an in-vehicle system according to a second embodiment.

According to this embodiment, a different message is used for transmitting the shared memory data based on an event detection and for transmitting memory data by the fixed-period transmission.

In this embodiment, the event detecting section 105 upon detection of an event, outputs an event detection flag ON to the fixed-period communication processing section 102. The fixed-period communication processing section 102 performs data transmission as an event notifying message flag is ON, when the event detection flag is ON.

When YES in S603 in FIG. 6 described in the first embodiment, that is, when the remaining time on the fixed-period communication timer 103 is shorter than the permitted delay time, event data is transmitted from the fixed-period communication processing section 102.

Then, when the event detection flag is ON, the fixed-period communication processing section 102 performs data transmission as the event notifying message so that the BCM 200 can identify that the transmitted data is event data.

The event communication processing section 106 always performs data transmission as a message for event notification.

The fixed-period communication processing section 102 and the event communication processing section 106, upon transmission of the event notifying message, notifies the event detecting section 105 of an event transmission completion notice.

The event detecting section 105, upon receipt of the event transmission completion notice, resets the detection flag to OFF.

When the event detection flag is OFF, the fixed-period communication processing section 102 performs data transmission as a message for the fixed-period communication.

This enables the BCM 200 upon receipt of the data to readily determine whether to treat it as an urgent event or to treat it as a normal routine process.

Thus, this embodiment describes the multiplex transmission apparatus which uses the message different for the event communication and for the fixed-period communication so as to enable the controller to identify whether an event has occurred, without referring to the content of the data.

Embodiment 3.

Figure 5:
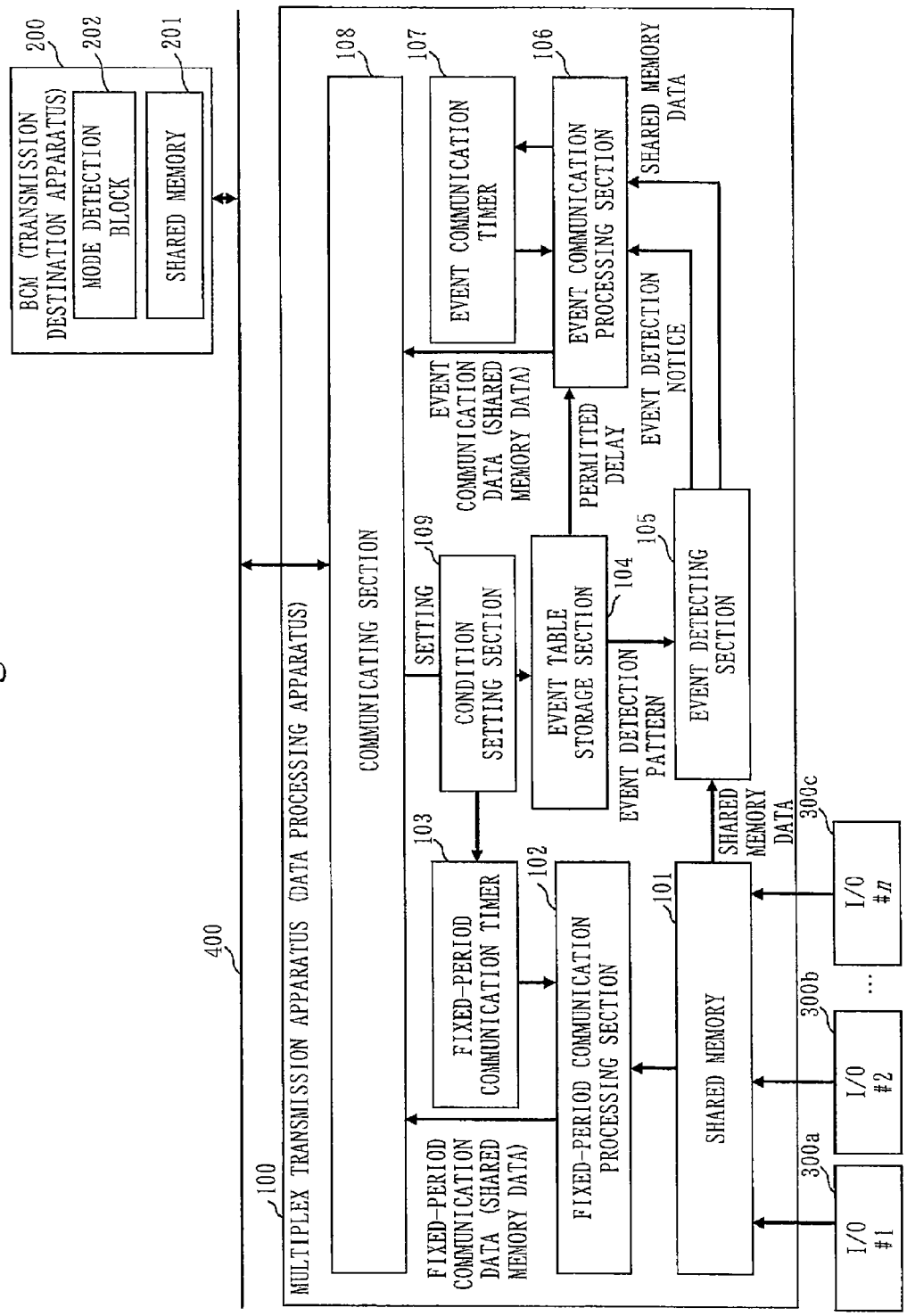
FIG. 5 shows an example of the configuration of an in-vehicle system according to a third embodiment.

FIG. 5 shows an example of the configuration of an in-vehicle system according to a third embodiment.

The in-vehicle system of this embodiment further includes a mode detection block 202 in the BCM 200.

In this embodiment, the condition setting section 109 changes the cycle of the fixed-period communication and the event table, according to the operation mode of a vehicle.

The in-vehicle system needs to be operated using less electricity while the engine is OFF, and therefore the communications needs to be less frequent compared to when the vehicle is moving.

Further, when the engine is OFF, since the system for running is inactive, the type of the event to be detected is different from that while the vehicle is moving.

In this embodiment, the mode detection block 202 in the BCM 200 detects an engine OFF mode, and notifies the condition setting section 109 of an updated value of the cycle of the fixed-period communication (timer value of the fixed-period communication timer 103) and an updated value of the event table.

Then, the condition setting section 109 updates the cycle of the fixed-period communication (timer value of the fixed-period communication timer 103) and the event table to have the notified updated values.

This will satisfy the above request.

Alternatively, however, the mode change may be detected by the DHM 100 autonomously or upon receipt of a message from the BCM 200, and the condition setting section 109 may switch the value of the fixed-period communication timer 103 and the value of the event table to values corresponding to each mode.

The event table is updated by the condition setting section 109 so as to include the event whose permitted delay time is shorter than the updated cycle of the fixed-period communication.

For example, assuming that the present event table is as in FIG. 2 and the cycle of the fixed-period communication is 10 ms, if the cycle of the fixed-period communication is changed to 20 ms due to the engine turned OFF, the condition setting section 109 adds the events #6 and #7 shown in FIG. 3 to the event table.

As to mode switching, a plurality of modes may be defined, in addition to the engine OFF, such as idle stop, stoplight stop, highway run, etc.

This can set events to be detected and the cycle of the fixed-period communication optimally.

Further, in this embodiment, the cycle of the fixed-period communication may be set to infinite to make the event communication performed exclusively.

Further, the event table may be set to empty to make the fixed-period communication performed exclusively.

As aforementioned, this embodiment describes that the cycle of the fixed-period communication can be changed from the outside of the multiplex transmission apparatus.

Further, as aforementioned, this embodiment describes that the specific input state for the event detection and the permitted delay time can be changed from the outside of the multiplex transmission apparatus.

Further, as aforementioned, this embodiment describes that the cycle of the fixed-period transmission, the specific input state for the event detection, and the permitted delay time can be changed according to the operation mode of the vehicle.

Further, as aforementioned, this embodiment describes that when the engine is turned OFF, a larger cycle of the fixed-period communication is set, and only the events that are associated with the engine OFF is set as the events to be detected.

Finally, an example of the hardware configuration of the DHM 100 described in any of the first embodiment to the third embodiment is described with reference to FIG. 7.

The DHM 100 is a computer. The elements of the DHM 100 may be executed by programs.

The programs may be stored in a storage medium, and read by the computer from the storage medium.

A hardware configuration of the DHM 100 includes an arithmetic device 701, an external storage device 702, a main storage device 703, a communication device 704, and a timer 705 which are connected together via a bus.

The arithmetic unit 701 is a CPU (central processing unit) for executing the programs.

The external storage device 702 is a ROM (read only memory) or a flash memory, for example.

The main storage device 703 is a RAM (random access memory), which corresponds to the shared memory 101.

The communication device 704 corresponds to the physical layer of the communicating section 108.

The timer 705 corresponds to the fixed-period communication timer 103 and also to the event communication timer 107.

The programs are usually stored in the external storage device 702, sequentially read via the main storage device 703 which loads the programs, and executed by the arithmetic device 701.

The programs implement functions described as a "section" shown in FIG. 1 (except for "event table storage section 104", the same shall apply hereinafter).

The external storage device 702 also stores an operating system (OS), some of which is loaded in the main storage device 703 to be executed by the arithmetic devise 701 when executing programs to implement the functions of "sections" shown in FIG. 1.

The main storage device 703 stores as files, information, data, signal values, and variable values, which indicate the results of "determination", "detection", "extraction", "comparison", "setting", "registration", "selection", "generation", "input", "updating", etc. processes described in the first embodiment to the third embodiment.

Cypher/decipher keys, random values, and parameters may also be stored as files in the main storage device 703.

Figure 7:
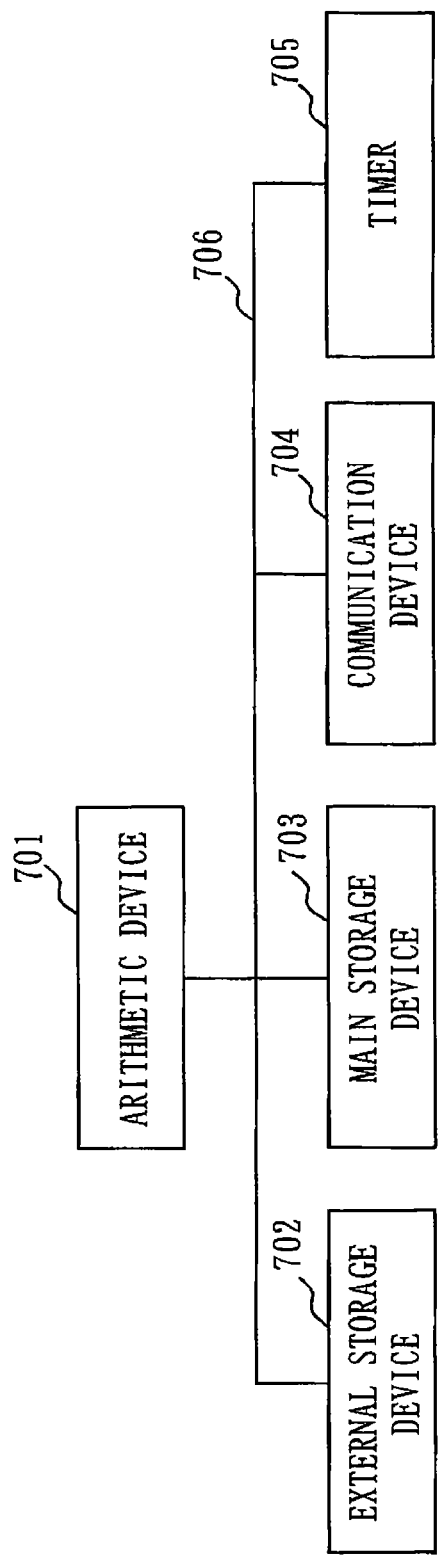
FIG. 7 shows an example of the hardware configuration of a multiplex transmission apparatus according to any one of the first embodiment to the third embodiment.

Since the configuration of FIG. 7 shows just only an example of the hardware configuration of DHM 100, any other hardware configuration may be applied to the DHM 100.

The method for improving efficiency in data transmission discussed in any of the first embodiment to the third embodiment is applied, but not limited to, the in-vehicle system.

REFERENCE SIGNS LIST 100 multiplex transmission apparatus
101 shared memory
102 fixed-period communication processing section
103 fixed-period communication timer
104 event table storage section
105 event detecting section
106 event communication processing section
107 event communication timer
108 communicating section
109 condition setting section
200 BCM
201 shared memory
202 mode detection block
300 I/O device
400 CAN

The invention claimed is:

1. A data processing apparatus comprising:
a data receiving section that receives data;
a first data transmitting section that transmits the data received by the data receiving section to a transmission destination apparatus, upon arrival of a transmission timing which arrives repeatedly, the data to be transmitted received before the arrival of the transmission timing;
a second data transmitting section that transmits the data received by the data receiving section to the transmission destination apparatus before the arrival of the transmission timing of the first data transmitting section;
a condition information storage section that stores condition information, which indicates a condition of the data to be transmitted by the second data transmitting section, and a permitted delay time, which is a period of time permitted starting from when the data satisfying the condition is extracted, until the data satisfying the condition is transmitted; and an event data extracting section that monitors the data received by the data receiving section, and extracts, as event data, the data satisfying the condition indicated by the condition information;

wherein: the second data transmitting section transmits the event data extracted by the event data extracting section to the transmission destination apparatus, before the arrival of the transmission timing of the first data transmitting section, and by an event data transmission time limit, which is a timing at which the permitted delay time elapses from the time of the event data extraction by the event data extracting section;

the event data extracting section, when extracting new event data that satisfies a new condition before a timeout of the event data transmission time limit of any event data, determines which of the event data transmission time limit of the new event data and the event data transmission time limit of the any event data arrives first, and changes the transmission time limit to the event data transmission time limit of the new event data when the event data transmission time limit of the new event data arrives first;

the second data transmitting section, when the timeout is issued, transmits to the transmission destination apparatus the event data extracted by the event data extracting section before the issuance of the timeout;

the first data transmitting section transmits data to the transmission destination apparatus, upon arrival of the transmission timing which arrives at a predetermined transmission interval, and the condition information storage section stores the condition information indicating the plurality of conditions and the permitted delay time for each condition, which is shorter than the transmission interval of the first data transmitting section;

a condition setting section that changes the transmission interval of the first data transmitting section, and changes the condition information so that the permitted delay time which is shorter than the changed transmission interval is described for each condition;

the data processing apparatus and the transmission destination apparatus are mounted on a vehicle; the condition setting section changes the transmission interval of the first data transmitting section and the condition information, based on an operational state of the vehicle; and the condition setting section changes the transmission interval of the first data transmitting section when the vehicle is in an engine OFF state so that the interval is longer than when the vehicle is in an engine ON state.

2. The data processing apparatus of claim 1, wherein:
the condition information storage section stores the condition information which indicates a plurality of conditions and the permitted delay time for each of the plurality of conditions; and
the second data transmitting section, when two or more items of the event data are extracted by the event data extracting section for two or more conditions indicated by the condition information, transmits the two or more items of the event data to the transmission destination apparatus by the event data transmission time limit that arrives first among two or more event data transmission time limits for the two or more items of the event data.

3. The data processing apparatus of claim 1, wherein:
the event data extracting section determines, upon extraction of the event data, which of the event data transmission time limit of the extracted event data and a subsequent transmission timing of the first data transmitting section arrives first, and
the second data transmitting section transmits the event data to the transmission destination apparatus by the event data transmission time limit when the event data extracting section determines that the event data transmission time limit arrives before the subsequent transmission timing of the first data transmitting section.

4. The data processing apparatus of claim 3, wherein the first data transmitting section transmits the event data to the transmission destination apparatus at the subsequent transmission timing, when the event data extracting section determines that the event data transmission time limit and the subsequent transmission timing both arrive at the same time, or that the subsequent transmission timing arrives before the event data transmission time limit.

5. The data processing apparatus of claim 4, wherein the first data transmitting section transmits the event data to the transmission destination apparatus in a way to allow the transmission destination apparatus to identify the event data.

6. The data processing apparatus of claim 1, wherein the first data transmitting section transmits the data received by the data receiving section to the transmission destination apparatus at the transmission timing at which the transmission interval elapses from the time of the event data transmission to the transmission destination apparatus by the second data transmitting section.

7. The data processing apparatus of claim 1, wherein the condition setting section changes the transmission interval of the first data transmitting section and the condition information, based on an instruction from an external apparatus.

8. The data processing apparatus of claim 1, wherein:
the data receiving section receives data from a plurality of devices; and
the condition information storage section stores the condition information which indicates a transmission source device of the data, and a condition relating to a value of the data.

9. A non-transitory computer readable medium including a program:
causing a computer to execute the processes of:
a data receiving process for receiving data;
a first data transmission process for transmitting the data received by the data receiving process to a transmission destination apparatus, upon arrival of a transmission timing which arrives repeatedly, the data to be transmitted received before the arrival of the transmission timing;
a second data transmission process for transmitting the data received by the data receiving process to the transmission destination apparatus before the arrival of the transmission timing of the first data transmission process;
a condition information retrieval process for retrieving condition information from a predetermined storage area, the condition information indicating a condition of the data to be transmitted by the second data transmission process, and a permitted delay time which is a period of time permitted starting from when data satisfying the condition is extracted, until the data satisfying the condition is transmitted;
an event data extraction process for monitoring the data received by the data receiving process, and extracting, as event data, the data satisfying the condition indicated by the condition information; and causing the computer to in the second data transmission process, transmit the event data extracted by the event data extraction process to the transmission destination apparatus, before the arrival of the transmission timing of the first data transmission process, and by an event data transmission time limit, which is a timing at which the permitted delay time elapses from the time of the event data extraction by the event data extracting process;

in the event data extraction process, when extracting new event data that satisfies a new condition before a timeout of the event data transmission time limit of any event data, determine which of the event data transmission time limit of the new event data and the event data transmission time limit of the any event data arrives first, and changes the transmission time limit to the event data transmission time limit of the new event data when the event data transmission time limit of the new event data arrives first;

in the second data transmission process, when the timeout is issued, transmit to the transmission destination apparatus the event data extracted by the event data extracting process before the issuance of the timeout;

wherein: the first data transmitting process transmits data to the transmission destination apparatus, upon arrival of the transmission timing which arrives at a predetermined transmission interval, and the predetermined storage area stores the condition information indicating the plurality of conditions and the permitted delay time for each condition, which is shorter than the transmission interval of the first data transmitting process;

a condition setting process that changes the transmission interval of the first data transmitting process, and changes the condition information so that the permitted delay time which is shorter than the changed transmission interval is described for each condition;

the computer and the transmission destination apparatus are mounted on a vehicle; the condition setting process changes the transmission interval of the first data transmitting process and the condition information, based on an operational state of the vehicle; and the condition setting process changes the transmission interval of the first data transmitting process when the vehicle is in an engine OFF state so that the interval is longer than when the vehicle is in an engine ON state.

\* \* \* \* \*